May 27, 1924.  
W. E. THOMAS  
BAGGAGE TRUCK  
Filed April 18, 1922  
1,495,819
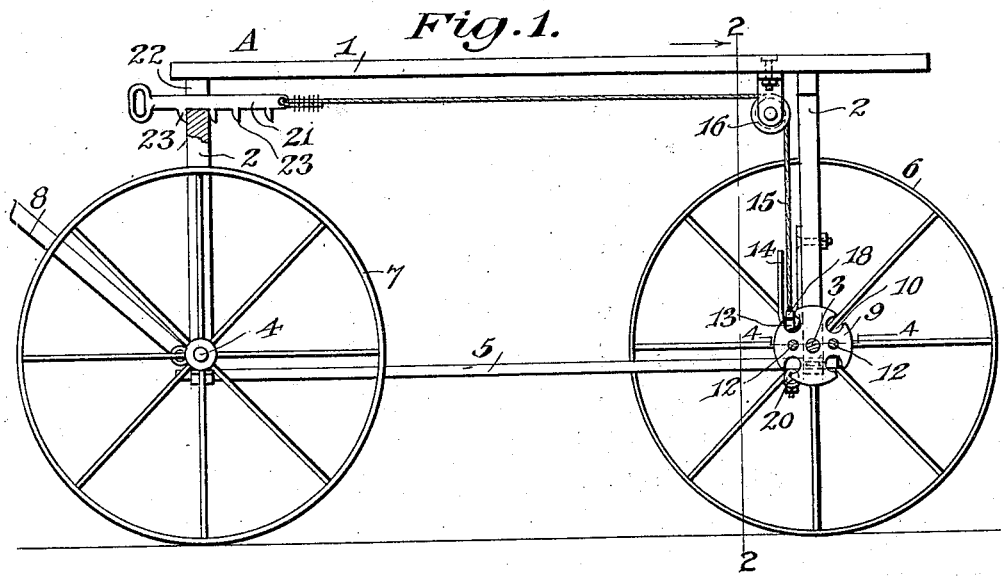
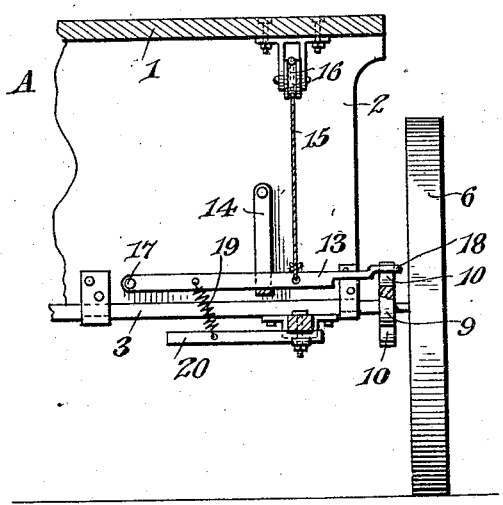
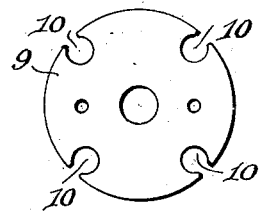
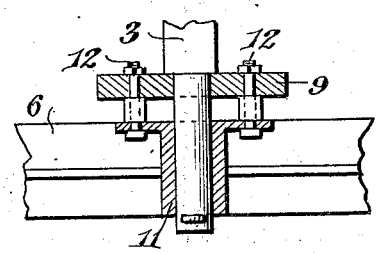
W. E. Thomas, INVENTOR.
BY
Geo. P. Kimmel
ATTORNEY.

Patented May 27, 1924.

1,495,819

UNITED STATES PATENT OFFICE.

WILL EDWARD THOMAS, OF MORGAN, TEXAS.

BAGGAGE TRUCK.

Application filed April 18, 1922. Serial No. 554,734.

*To all whom it may concern:*

Be it known that I, WILL EDWARD THOMAS, a citizen of the United States, residing at Morgan, in the county of Bosque and State of Texas, have invented certain new and useful Improvements in Baggage Trucks, of which the following is a specification.

This invention has reference to baggage trucks and is designed to prevent movement of the truck upon a station platform, whereby such truck may be accidentally moved into engagement with a passing train and struck by such train to the damage or destruction of the truck.

A large amount of damage occurs in railway stations by the unintentional movement of trucks standing near the railway tracks, where the windage of passing trains will draw the trucks toward the moving trains to be struck by the latter and damaged thereby, especially in the case of through trains where the windage of such trains causes the trucks to move toward the tracks near enough so that impact of the passing train will do damage to the trucks, especially where the truck is not anchored against movement, and, being of light construction, the windage of the passing train would set the truck in motion until such truck is brought into contact with the train to the destruction of the truck, or at least serious damage to the truck.

In accordance with the invention, the truck which is usually a four wheeled structure, is, unless provision be made to the contrary, liable to move along with a passing train and into contact therewith until struck by the train.

In order to avoid such contingency, the truck is supplied with a brake structure and with locking means controlled thereby, preventing movement of the truck, unless such movement be purposely desired.

In order to lock or anchor the truck, there is provided a latch controlled from an accessible part of the truck and which will positively lock the wheels of the truck, or one or more of them, against movement.

The invention will be best understood from a consideration of the following detailed description taken in connection with the accompanying drawings forming part of this specification with the understanding however that the invention is not confined to any strict conformity with the showing of the drawings but may be changed and modified so long as such changes and modifications mark no material departure from the salient features of the invention as expressed in the appended claims.

In the drawings:—

Figure 1 is a side elevation, with some parts in longitudinal section of a truck embodying the invention.

Fig. 2 is a section on the line 2—2 of Fig. 1.

Fig. 3 is a side elevation of a lock brace employed in connection with the truck.

Fig. 4 is a section on the line 4—4 of Fig. 1, but drawn on a larger scale.

Fig. 5 is a sectional detail of a guide employed in the structure.

Referring to the drawings, there is shown a truck A comprising a platform 1 mounted at opposite ends upon bolsters 2 rising from forward and rear axles 3, 4, respectively, and the bolsters and axles are joined together by a reach 5. The axles 3 and 4 carry respective supporting wheels 6 and 7 upon which the truck travels.

In a particular showing of the drawings, the wheels 6 and 7 are of the same size and a manipulating handle 8 is connected to the axle 4 and may be utilized to either push or pull the truck as the case may be.

Mounted on the axle 3 near one end thereof and secured against rotation thereon, is a disk 9 with notches or recesses 10 in the peripheral portion thereof, the notches 10 being arranged in circular series, with the notches of generally circular contour and opening through the periphery of the disk. The wheels 6 are locked against rotation by an arm 13 pivoted to the bolster 2 and having one end movable in and out of some one of the notches 10. The arm 13 is held by a guide 14 carried by the bolster 2, with the arm 13 sustained by a rope or cable 15 fast to the arm 13 and carried about a pulley 16 sustained by the bolster 2.

The arm 13 has a pivot support 17 at one end carried by the bolster 2 and at the other end is provided with a nose 18 in position to move into and out of any one of the notches 10 to lock or unlock the disk 9. The arm 13 is constrained by a spring 19 fast at one end to the arm 13 and at the other end to a fixed support 20 fast to the axle 3 or some other fixed part of the machine. The cable 15 is fast to the arm 13 so as to act thereon in opposition to the spring 19 and the cable 15 is under the control of a toothed holder 21 extending through a perforation 22 in the bolster 2 at the end of the machine carrying the axle 3.

The holder 21 is furnished with a series of teeth 23 which may pass through the perforation 22 and hold the cable 15 in a taut condition, with the nose 18 in elevated relation to a respective notch 10 whereby the wheels 6 or one of them may freely turn, thus releasing the wheel to movement.

When it is desired to lock the truck so that it cannot be drawn toward a train, the cable 15 is loosened and the spring 19 will then cause the arm 13 to engage the nose 18 into one of the notches 10 thus holding the wheel 6 from rotation.

What is claimed is:—

1. A railroad baggage or express truck comprising rotatable supporting means, axles connecting the same, front and rear bolsters mounted upon the said axles, the front bolster having an aperture therethrough, a platform carried by said bolsters, a notched disc attached to one of the supporting wheels, a pivoted arm carried upon the rear bolster and elastically constrained into locking position with the disc, a guide for said arm carried by said rear bolster, a toothed bar passing through said aperture and adjustably engaging said bolster, and connecting means between said bar and arm.

2. A railroad baggage or express truck comprising rotatable supporting means, axles connecting the same, front and rear bolsters mounted upon said axles, the front bolster having an aperture therethrough, a platform carried by said bolsters, a notched disc attached to one of the supporting wheels, a pivoted arm carried upon the rear bolster and elastically constrained into locking position with the disc, a guide for said arm carried by said rear bolster, a toothed bar passing through said aperture and adjustably engaging said bolster, connecting means between said bar and arm, and a pulley carried upon the under surface of said platform near the side edge thereof and adjacent the inner side of said rear bolster, over which said connecting means passes.

In testimony whereof, I affix my signature hereto.

WILL EDWARD THOMAS.